(12) United States Patent
Mikawa et al.

(10) Patent No.: US 11,363,208 B2
(45) Date of Patent: Jun. 14, 2022

(54) IMAGE PROCESSING APPARATUS AND IMAGE PROCESSING METHOD

(71) Applicant: CANON KABUSHIKI KAISHA, Tokyo (JP)

(72) Inventors: Chiaki Mikawa, Kanagawa (JP); Tomoya Asanuma, Kanagawa (JP); Yuuya Miyake, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/119,819

(22) Filed: Dec. 11, 2020

(65) Prior Publication Data

US 2021/0099650 A1    Apr. 1, 2021

Related U.S. Application Data

(63) Continuation of application No. PCT/JP2019/022846, filed on Jun. 10, 2019.

(30) Foreign Application Priority Data

Jun. 19, 2018   (JP) .............................. JP2018-116378

(51) Int. Cl.
*H04N 5/232* (2006.01)
*G06K 7/14* (2006.01)

(52) U.S. Cl.
CPC ..... *H04N 5/23296* (2013.01); *H04N 5/23206* (2013.01); *H04N 5/23218* (2018.08); *H04N 5/23229* (2013.01); *G06K 7/1447* (2013.01)

(58) Field of Classification Search
CPC ........... H04N 5/23296; H04N 5/23218; H04N 5/23206; H04N 5/23229; H04N 5/23299;
(Continued)

(56) References Cited

U.S. PATENT DOCUMENTS 7,611,059 B2 *  11/2009  Kobayashi ........... G06K 7/1095
                                                                235/454
8,061,615 B2 *  11/2011  Yada .......................... G06K 7/14
                                                                235/462.08
(Continued)

FOREIGN PATENT DOCUMENTS

CN    1967566 A    5/2007
CN    102184405 A    9/2011
(Continued)

OTHER PUBLICATIONS

Mingxia He, Meng Li, Fuxing, Ning, "Tire Model Recognition System Based on Character Recognition" (Full text and English Abstract) Apr. 25, 2009.

*Primary Examiner* — Hung H Lam
(74) *Attorney, Agent, or Firm* — Canon U.S.A., Inc. IP Division

(57) ABSTRACT

An image processing apparatus that is capable of communicating with an image capturing apparatus, acquires a first image generated by performing an image capture process at a first zoom magnification, sets a division condition for dividing a detection range included in the first image, divides the detection range into a plurality of divided areas in accordance with the division condition, controls the image capturing apparatus to change an image capture direction on the basis of each position of the respective divided areas of the detection range and performs an image capture process at a second zoom magnification greater than the first zoom magnification so as to sequentially generate second images, acquires each of the second images, and performs a data reading process for each of the second images.

19 Claims, 16 Drawing Sheets

(58) Field of Classification Search
CPC ............... H04N 5/23216; H04N 7/185; H04N 5/23212; G06K 7/1447; G06K 9/2054; G06T 7/74; G06T 7/11
See application file for complete search history.

(56) References Cited

U.S. PATENT DOCUMENTS

| | | | |
|---|---|---|---|
| 2009/0060349 A1* | 3/2009 | Linaker | G06K 9/00664 |
| | | | 382/209 |
| 2011/0090508 A1 | 4/2011 | Rembe | |
| 2012/0048937 A1* | 3/2012 | Dahari | G06K 7/14 |
| | | | 235/462.08 |
| 2012/0070086 A1* | 3/2012 | Miyamoto | G06K 9/325 |
| | | | 382/195 |
| 2012/0120069 A1 | 5/2012 | Kodaira | |
| 2013/0147998 A1 | 6/2013 | Yoshimura | |
| 2013/0235224 A1 | 9/2013 | Park | |

FOREIGN PATENT DOCUMENTS

| | | |
|---|---|---|
| CN | 102542272 A | 7/2012 |
| CN | 102611846 A | 7/2012 |
| CN | 102880850 A | 1/2013 |
| CN | 103973974 A | 8/2014 |
| CN | 204462371 U | 7/2015 |
| CN | 106134178 A | 11/2016 |
| CN | 106918711 A | 7/2017 |
| CN | 107454309 A | 12/2017 |
| JP | H09-114913 A | 5/1997 |
| JP | 2011-142685 A | 7/2011 |
| JP | 2011-150460 A | 8/2011 |
| JP | 2012-053550 A | 3/2012 |
| JP | 2012-064110 A | 3/2012 |
| JP | 2012054724 A | 3/2012 |
| JP | 2013-161097 A | 8/2013 |

* cited by examiner

FIG. 9

| ID | COUNTER | DIVIDED IMAGE CAPTURE COORDINATE X | DIVIDED IMAGE CAPTURE COORDINATE Y | ZOOM RANGE X0, X1, Y0, Y1 | | | | NUMBER OF DETECTIONS | DETECTION No. | CENTER COORDINATE X | CENTER COORDINATE Y | DETECTION ANGLE | CODE | CODE DETECTION RELIABILITY | DICTIONARY NUMBER | DETERMINATION OF NUMBER OF DETECTIONS | DETERMINATION OF MATCH AGAINST DICTIONARY | BOTTOM LINE |
|---|---|---|---|---|---|---|---|---|---|---|---|---|---|---|---|---|---|---|
| 1 | 1 | 190 | 300 | 170 | 210 | 290 | 310 | 2 | 1 | 670 | 773 | 5 | AAA12345 | 99 | 6 | OK | OK | OK |
| 2 | 1 | 190 | 300 | | | | | 2 | 2 | 675 | 916 | 5 | BBB11222 | 97 | 7 | OK | OK | OK |
| 3 | 2 | | | | | | | | | | | | | | | | | |
| 2 | 15 | | | | | | | | | | | | | | | | | |
| 9 | | | | | | | | | | | | | | | | | | |
| 3 | 15 | | | | | | | | | | | | | | | NG | OK | NG |
| 0 | | | | | | | | | | | | | | | | | | |

FIG. 15

| UNIT No. | NAME |
|---|---|
| 008 | DATA 1 |
| 009 | DATA 2 |
| 010 | DATA 3 |
| 011 | DATA 4 |
| 012 | DATA 5 |
| 013 | DATA 6 |
| 014 | DATA 7 |
| 015 | DATA 8 |

DATA TYPE: 006: 1D CODE READING PROCESS
NUMBER OF DATA: 30
GENERATE
CONTENT:
OK   CANCEL

IMAGE PROCESSING APPARATUS AND IMAGE PROCESSING METHOD

CROSS-REFERENCE TO RELATED APPLICATIONS

This application is a Continuation of International Patent Application No. PCT/JP2019/022846, filed Jun. 10, 2019, which claims the benefit of Japanese Patent Application No. 2018-116378, filed Jun. 19, 2018, both of which are hereby incorporated by reference herein in their entirety.

BACKGROUND OF THE INVENTION

Field of the Invention

The present invention relates to an image processing apparatus, an image processing method, a program, and a storage medium.

Background Art

In recent years, systems have become widely used that are capable of controlling, via a network, pan, tilt, and zoom operations performed by a camera installed in a remote location by using a terminal at a monitoring side. Japanese Patent Laid-Open No. 2011-142685 describes a technique for controlling a camera in such a monitoring system, in which part of a captured image is specified with a pointing device, such as a mouse, and the camera is controlled to capture the image of the specified area. In addition, Japanese Patent Laid-Open No. 2011-150460 describes an inventory management system that reads bar codes with a camera to control inventory.

However, in existing techniques, when there are a plurality of objects to be image-captured, it is necessary to specify a pan, tilt, or zoom operation for each of the objects individually, which takes a long time to process.

The present invention has been made in view of such problems, and it is an object of the present invention to reduce the processing load related to image capture and reduce the processing time when there are a plurality of objects to be image-captured.

SUMMARY OF THE INVENTION

Therefore, according to the present invention, an image processing apparatus capable of communicating with an image capturing apparatus, comprising: a processor; and a memory storing a program which, when executed by the processor, causes the image processing apparatus to: acquire a first image generated by performing an image capture process at a first zoom magnification; set a division condition for dividing a detection range included in the first image; divide the detection range into a plurality of divided areas in accordance with the division condition; control the image capturing apparatus to change an image capture direction on the basis of each position of the respective divided areas of the detection range and perform an image capture process at a second zoom magnification greater than the first zoom magnification so as to sequentially generate second images; acquire each of the second images; and perform a data reading process for each of the second images.

Further features of the present invention will become apparent from the following description of exemplary embodiments with reference to the attached drawings.

BRIEF DESCRIPTION OF THE DRAWINGS

FIG. 9 is a diagram illustrating an example of a detection result.
FIG. 15 is a diagram illustrating an example of a data storage area.

DESCRIPTION OF THE EMBODIMENTS

Embodiments of the present invention are described below with reference to the accompanying drawings.

First Embodiment

Figure 1:
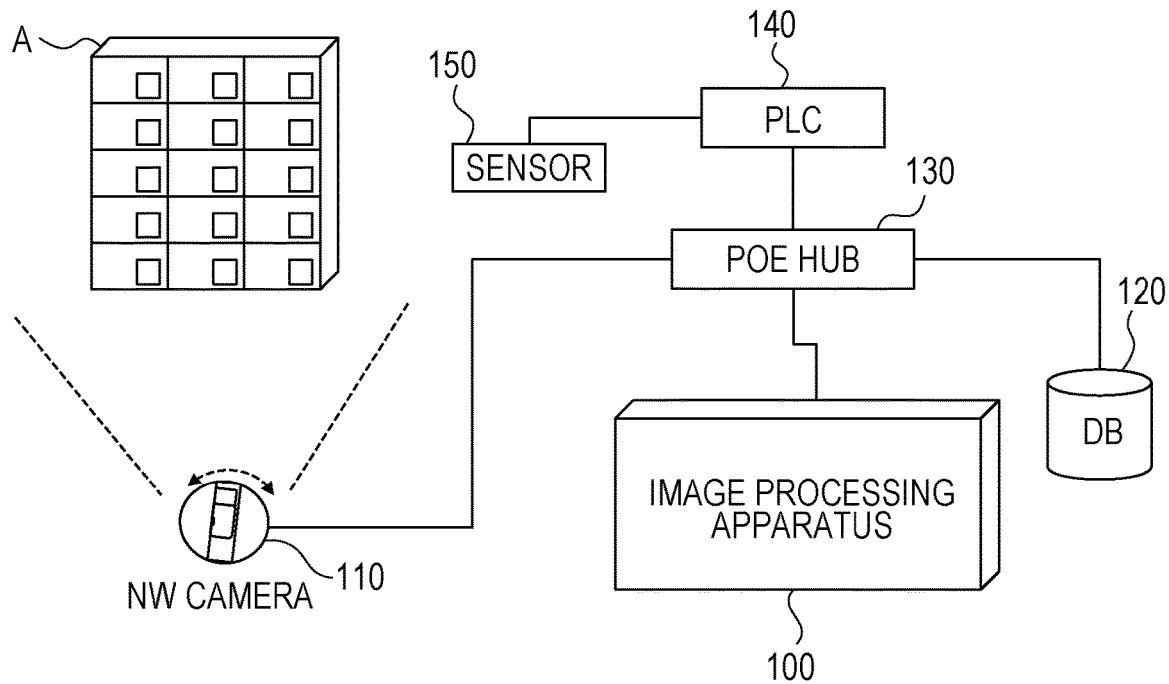
FIG. 1 is an overall configuration diagram of an image processing system.

FIG. 1 is an overall configuration diagram of an image processing system. The image processing system according to the present embodiment captures the image of a cargo carried in to a factory or the like, reads a bar code attached to the cargo, and checks the bar code against the content of the bar code registered in advance. In this manner, the image processing system determines whether the cargo or the like is carried in to the factory as planned. Furthermore, according to the present embodiment, it is assumed that a tag is attached to each of packages included in a cargo to be image-captured, and the tag is printed with a bar code. The image processing system according to the present embodiment sequentially reads and checks the bar code printed on the tag attached to each of the packages. Note that while the present embodiment is described with reference to an object to be read and checked by an image processing apparatus 100 being a bar code, an object to be read and checked is not limited to a bar code. Another example of an object to be read may be a number, a character or a symbol itself, or a shape, such as a figure, that represents such information in accordance with a predetermined rule.

The image processing system includes the image processing apparatus 100, a NW (network) camera 110, a DB (database) 120, and a POE (Power over Ethernet) hub 130. The image processing system further includes a PLC (programmable logical controller) 140 and a sensor 150.

The POE hub 130 is connected to the image processing apparatus 100, the NW camera 110, the DB 120, and the PLC 140 to communicate with these units. In addition, the POE hub 130 supplies power to the units. In the DB 120, the content of the bar code printed on the tag attached to each of the plurality of packages to be carried in is registered in advance. The PLC 140 performs overall control of the image processing system. The sensor 150 detects that a cargo has been carried in to a predetermined location.

The image processing apparatus 100 is connected to the NW camera 110 via the POE hub 130. The image processing apparatus 100 controls image capture performed by the NW camera 110 by transmitting a control command (described below). The NW camera 110 is installed so as to capture the image of the location to which a cargo A is carried in and captures the image of the cargo A under the control of the image processing apparatus 100. Note that the cargo A is a stack of a plurality of packages each having a tag attached thereto. In addition, the image processing apparatus 100 receives, via the POE hub 130, the image obtained by the NW camera 110. The image processing apparatus 100 detects the image of the tag having a bar code printed thereon in the received image and reads the bar code. The image processing apparatus 100 checks the bar code information read from the image against the bar code information stored in the DB 120. In this way, the image processing apparatus 100 can confirm that the package or the like has been carried in as planned. Note that while the present embodiment is described with reference to the carrying in of the package as an example, the present embodiment can be applied to the checking at the time of carrying a package out.

Figure 2:
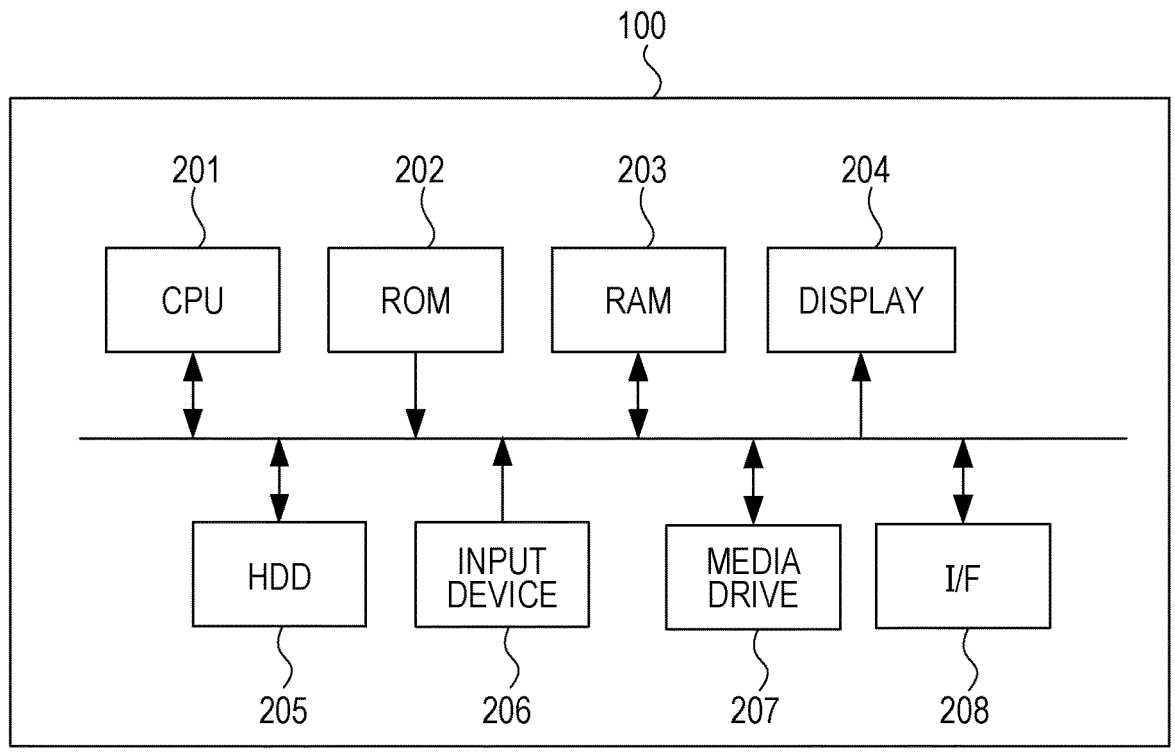
FIG. 2 is a hardware configuration diagram of an image processing apparatus.

FIG. 2 is a hardware configuration diagram of the image processing apparatus 100. The image processing apparatus 100 includes a CPU 201, a ROM 202, a RAM 203, a display 204, an HDD 205, an input device 206, a media drive 207, and an I/F 208. The CPU 201 reads out a control program stored in the ROM 202 and performs a variety of processes. The RAM 203 is used as a temporary storage area, such as the main memory of the CPU 201 and a work area. The HDD 205 stores various data, various programs, and the like. The display 204 displays various types of information. The input device 206 receives various operations performed by the user. The media drive 207 reads data from a medium, such as an SD card, and writes data to a medium, for example. The I/F 208 communicates with an external apparatus.

The functions and processes of the image processing apparatus 100 (described below) are achieved by the CPU 201 reading a program stored in the ROM 202 or the HDD 205 and executing the program. As another example, the CPU 201 may read out a program stored in a storage medium, such as an SD card, instead of the ROM 202 or the like. As still another example, at least a subset of the functions and processes of the image processing apparatus 100 may be achieved by, for example, a plurality of CPUs, RAMs, ROMs, and storages in cooperation with one another. Alternatively, as another example, at least a subset of the functions and processes of the image processing apparatus 100 may be achieved by using a hardware circuit.

Figure 3:
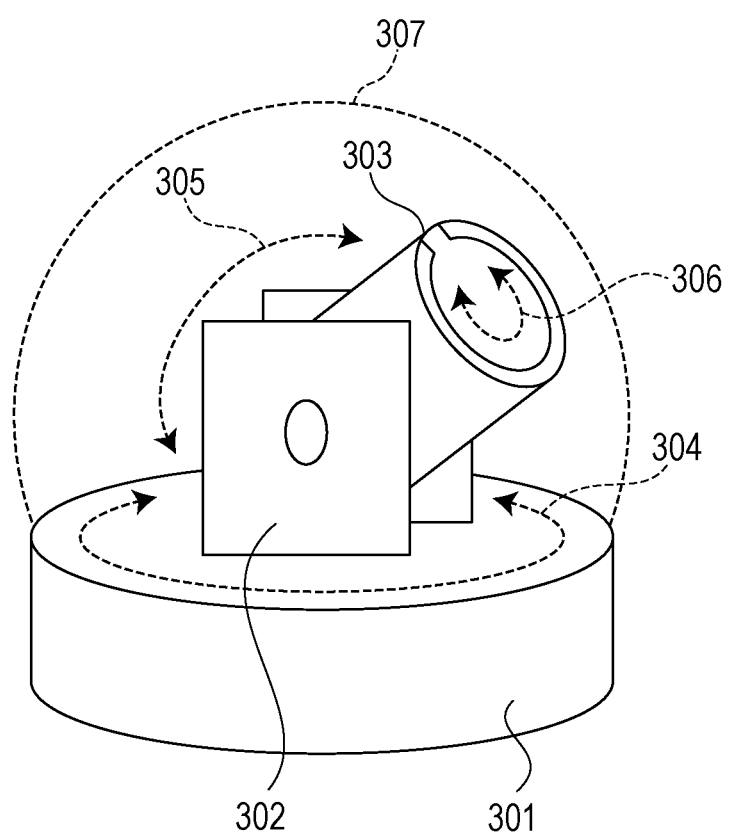
FIG. 3 is an external view of the NW camera.

FIG. 3 is an external view of the NW camera 110. Reference numeral 301 denotes a pan drive unit, which drives a pan motor to change the direction of a lens barrel unit 303 to the direction indicated by a pan direction 304. Reference numeral 302 denotes a tilt drive unit, which drives a tilt motor to change the direction of the lens barrel unit 303 to the direction indicated by a tilt direction 305. In addition, the lens barrel unit 303 including a lens is rotatable around the lens center position in a direction indicated by the rotation direction 306 under the control of a rotate motor. Furthermore, the lens barrel unit 303 includes a focus lens and a zoom lens, each of which is driven by a stepping motor. The NW camera 110 is entirely covered by a dome 307.

Figure 4:
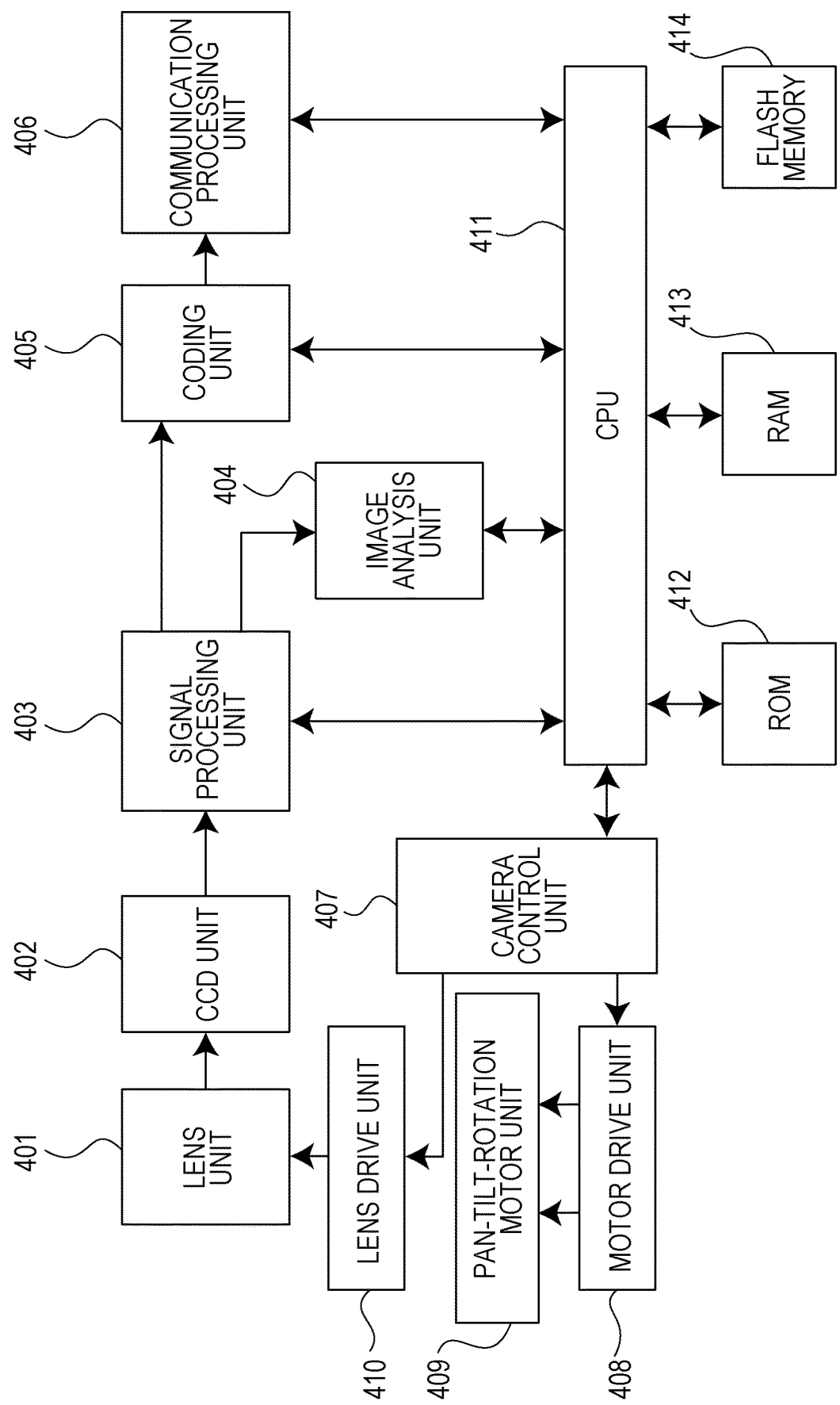
FIG. 4 is a hardware configuration diagram of an NW camera.

FIG. 4 is a hardware configuration diagram of the NW camera 110. The NW camera 110 is an image capturing apparatus capable of communicating with an external apparatus via the network. Reference numeral 401 denotes a lens unit. Reference numeral 402 denotes a CCD unit. Reference numeral 403 denotes a signal processing unit. Reference numeral 404 denotes an image analysis unit, reference numeral 405 denotes a coding unit, and reference numeral 406 denotes a communication processing unit. The process of delivering the image data captured by the NW camera 110 to the image processing apparatus 100 is described below. An optical image captured through the lens unit 401 is converted into RGB digital data by the CCD unit 402 and, thereafter, is transmitted to the signal processing unit 403. The signal processing unit 403 converts the RGB digital data into digital data (image data) in a YCbCr4:2:0 format or YCbCr4:2:2 format, converts the size of the image data into the size of a requested transmission image, and performs various filter processes, for example. The processed image data is transmitted to the image analysis unit 404 and the coding unit 405 at the same time. Thereafter, the image data is transmitted to an external apparatus via the network by the communication processing unit 406.

The coding unit 405 performs a process to encode and compress the image data into a predetermined format (e.g., the H.264 format or JPEG format). The H.264 moving image stream data or each of the JPEG still image data generated by the coding unit 405 is transmitted to the image processing apparatus 100 by the communication processing unit 406 in accordance with a network protocol, such as TCP/IP, HTTP, or RTP.

The image analysis unit 404 analyzes the captured image data and performs a process to detect whether the image pattern of an object to be image-captured or the image pattern that meets a specified condition is included in the target image. The process blocks such as the signal processing unit 403, the image analysis unit 404, the coding unit 405, and the communication processing unit 406 are connected to the CPU 411. Reference numeral 407 denotes a camera control unit, which is connected to a motor drive unit 408 and a lens drive unit 410. The camera control unit 407 outputs control signals for pan, tilt, and rotation operations of the camera (movements in the pan direction, tilt direction, and rotation about the optical axis) and control signals for zoom and AF (autofocus) operations in accordance with instructions from the CPU 411.

In addition, the camera control unit 407 controls at least one of the visible range and the movable range of the NW camera 110 in accordance with at least one of the visible range setting and the movable range setting stored in a RAM 413. The motor drive unit 408 is provided with a motor drive circuit and the like and drives a pan-tilt-rotation motor unit 409 in accordance with a control signal from the camera control unit 407. In this manner, the motor drive unit 408 can change the image capture direction of the camera by the rotation of the motor. The lens drive unit 410 includes a motor and a motor driving circuit for performing each of the control operations such as zooming and AF. The lens drive unit 410 is controlled in accordance with a control signal from the camera control unit 407.

Reference numeral 411 denotes a CPU (Central Processing Unit), which executes a control program stored in a ROM (Read Only Memory) 412 so as to perform overall control of the apparatus. The ROM 412, the RAM 413, and a FLASH memory 414 are connected to the CPU 411. Furthermore, the CPU 411 is connected to the signal processing unit 403, the image analysis unit 404, the coding unit 405, and the communication processing unit 406. The CPU 411 starts/stops the operation performed by each of process blocks, sets the operating conditions, and acquires the operation result, for example. Thus, the CPU 411 controls each of the process blocks. The ROM 412 stores programs and data for the CPU 411 to perform control of the apparatus, such as control of application process.

The RAM 413 is a memory to and from which the CPU 411 writes/reads data when the CPU 411 executes the program in the ROM 412. The RAM 413 has a work area, a temporary save area, and the like used by the CPU 411 to execute the program for apparatus control. The RAM 413 stores at least one of a visible range setting that determines the range of image capturable angle of view and a movable range setting that determines a movable range in the pan direction, tilt direction, and zoom direction.

The CPU 411 changes the image capture direction and the zoom magnification in accordance with the control command received from the image processing apparatus 100 via the communication processing unit 406. Upon receiving a control command for specifying the center position and zoom magnification from the NW camera 110, the CPU 411 controls pan-tilt in accordance with the control command so that the specified position coincides with the center of image capture and the zoom is set at the specified zoom magnification.

Figure 5:
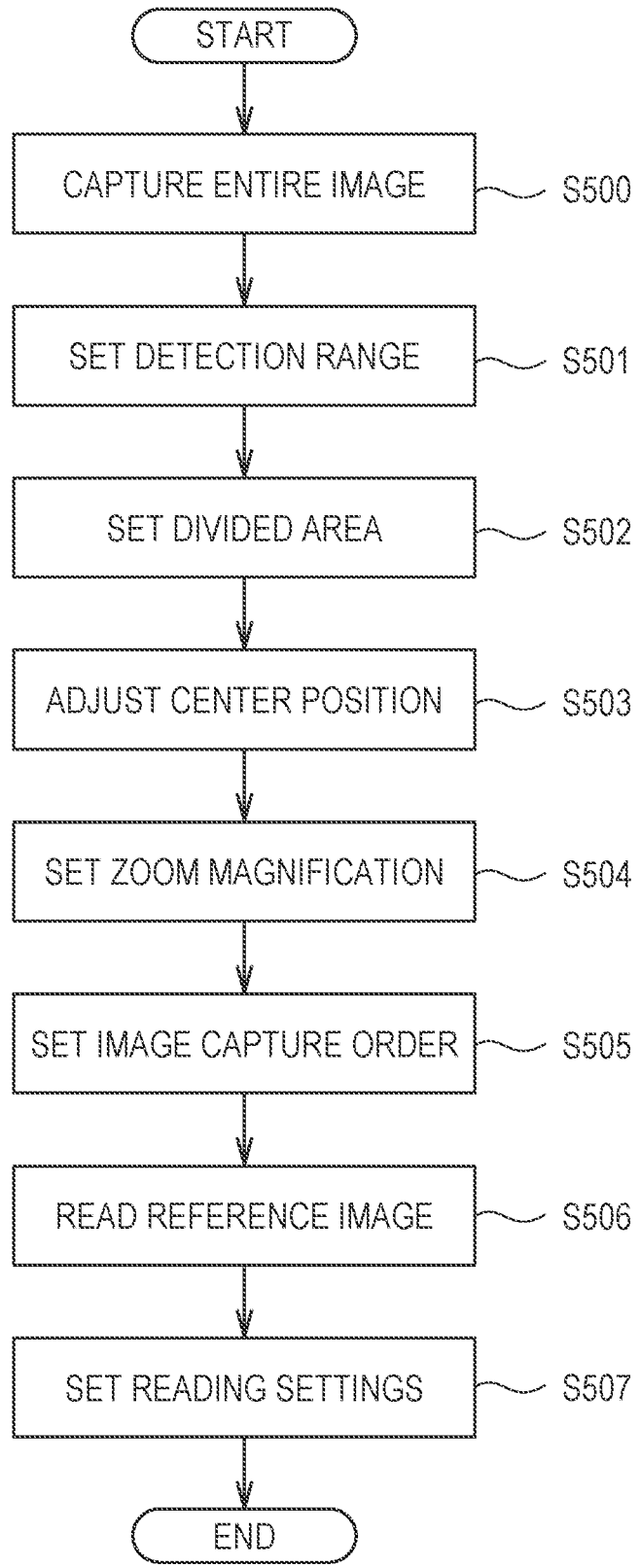
FIG. 5 is a flowchart illustrating a preparatory process.
Figure 6:
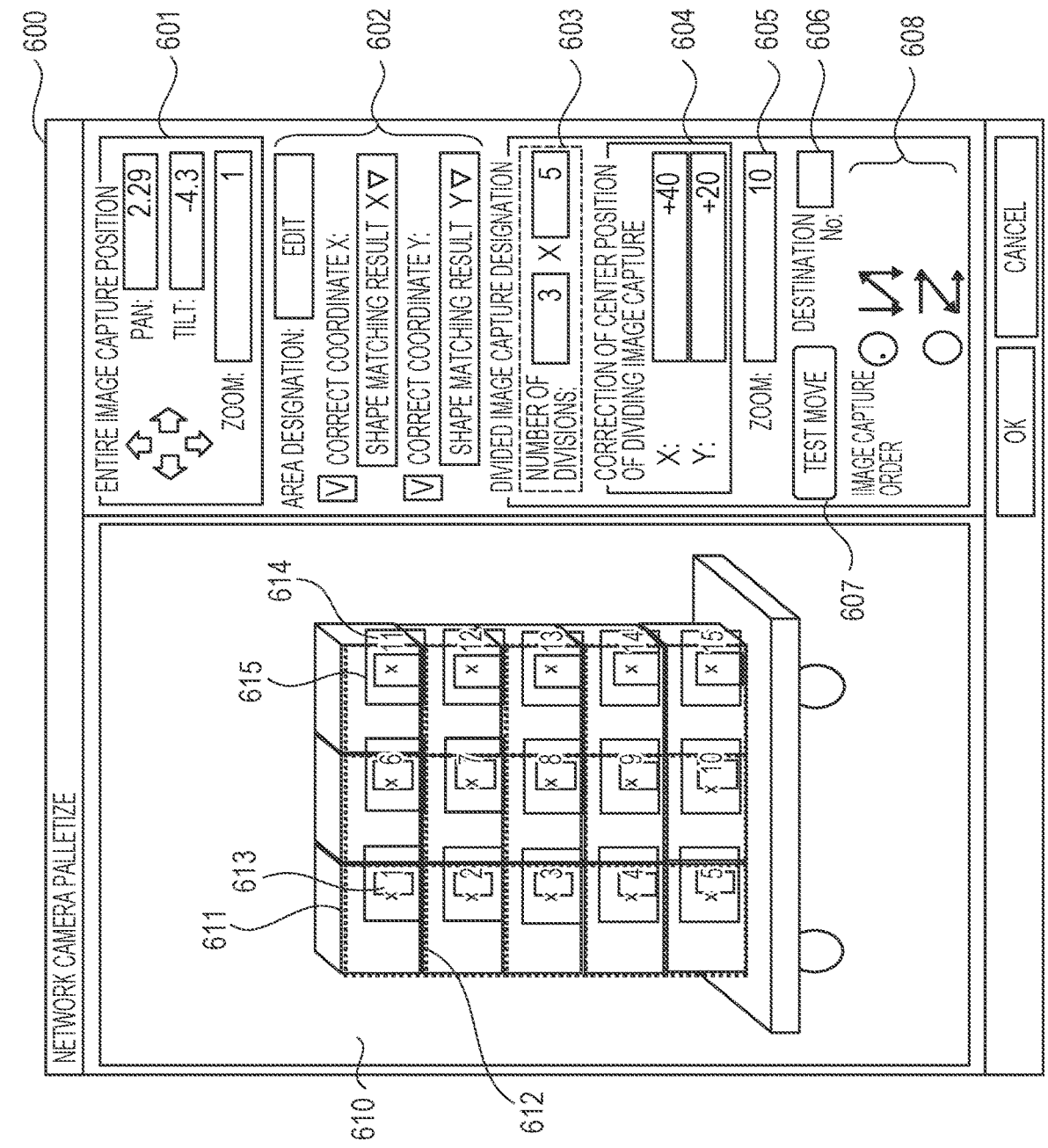
FIG. 6 is a diagram illustrating an example of an image capture screen.

FIG. 5 is a flowchart illustrating a preparatory process performed by the image processing apparatus 100. The preparatory process is a process for setting the image capture position of the NW camera and various settings for reading a bar code. FIG. 6 is a diagram illustrating an example of an image capture screen 600 displayed at the start of execution of the preparation process.

In S500, the CPU 201 controls the NW camera 110 to capture an entire image such that the cargo A is entirely included in the image capture range. Note that when capturing the entire image, the user can set the pan-tilt-zoom settings in a field 601 of the image capture screen 600. The CPU 201 generates a control command in accordance with the pan-tilt-zoom settings set through the user operation and transmits the control command to the NW camera 110. The NW camera 110 receives the control command from the image processing apparatus 100, performs the pan, tilt, and zoom operations in accordance with the settings indicated by the control command, performs an image capture process, acquires the entire image, and transmits the entire image to the image processing apparatus 100. The CPU 201 performs control so that the received entire image is displayed in a field 610.

Subsequently, in S501, the CPU 201 sets the region of the cargo A as a detection range within which a bar code is to be detected. More specifically, the CPU 201 detects the region of the cargo A in accordance with a preset image recognition process, such as edge detection, and sets the coordinates of the detected region as a bar code detection range. Furthermore, in a field 602 of the image capture screen 600, the user can change the detection range. If the user operation is performed, the CPU 201 changes the detection range in accordance with the user operation. The CPU 201 superimposes and displays, on the entire image, a frame 611 indicating the detection range.

Subsequently, in S502, the CPU 201 acquires the number of divisions of the detection range in accordance with the user operation and sets the acquired number as the number of divisions of the detection range. More specifically, when the user inputs the number of vertical divisions and the number of horizontal divisions into a field 603 of the image capture screen 600, the CPU 201 determines the numbers of divisions in accordance with the input. For example, in the example illustrated in FIG. 6, since three packages are arranged horizontally and five packages are arranged vertically, the user inputs the number of divisions of 3×5. After setting the number of divisions in accordance with the value input by the user, the CPU 201 draws division lines 612 in the detection range such that the detection range is evenly divided in accordance with the number of divisions. In addition, the CPU 201 assigns a number indicating the image capture order to each of the divided areas and displays a number 614 assigned to each divided area. Note that the CPU 201 displays a cross mark 613 indicating the position of the center of image capture when a zoomed image is captured (described later). As a default position, the cross mark 613 is displayed at the center of each of the divided areas.

Subsequently, in S503, if the user inputs a correction value of the center position of zoomed image capture into a field 604 of the image capture screen 600, the CPU 201 moves the center position of zoomed image capture from the current position (the default position is the center position of the divided area) in accordance with the input. Thus, the CPU 201 corrects the center position of zoomed image capture. In addition, the CPU 201 moves the display position of the cross mark 613 in accordance with the movement of the center position of zoomed image capture. By changing the correction value, the user adjusts the center position of zoomed image capture so that the center position of zoomed image capture overlaps the bar code to be read.

Subsequently, in S504, if the user inputs a zoom magnification into a field 605 of the image capture screen 600, the CPU 201 sets the zoom magnification for zoomed image capture in accordance with the input. Note that the zoom magnification set in the field 605 is greater than the zoom magnification set in the field 601. For this reason, the image capture range of zoomed image capture at the zoom magnification set in the field 601 is narrower than that of the entire image captured at the zoom magnification set in the field 605. In addition, the CPU 201 superimposes and displays, on the entire image, an image capture range 615 determined in accordance with the set zoom magnification and the center position of zoomed image capture. Note that the image capture range 615 is an example of a reading range for reading a bar code, and the processes in S502 to S504 is an example of an identifying process for identifying the image capture ranges of the zoomed images each corresponding to one of the divided areas, that is, the reading areas of the bar codes in one go.

For example, if the zoom magnification is specified as 10, it is assumed that one-tenth of the entire image can be captured in both the vertical and horizontal directions. Let baseW denote the width of the entire image, and let baseH denote the height of the entire image. In addition, let curZoom denote the zoom magnification. Let zoomW and zoomH denote the width and height of the zoomed image capture range, respectively. Then, the range of zoomed image capture is as follows:

$$zoomW = baseW \div curZoom, \text{ and}$$

$$zoomH = baseH \div curZoom.$$

When the user inputs a number into a field 606 for specifying the division area and presses a test move button 607, the CPU 201 acquires the center position of zoomed image capture set in S503 for the divided area corresponding to the specified number. Thereafter, the CPU 201 uses the center position as the center of image capture and generates a control command for capturing an image at the zoom magnification set in S504. The CPU 201 transmits the control command to the NW camera 110. The NW camera 110 receives the control command from the image processing apparatus 100, performs a pan-tilt-zoom operation in accordance with the settings indicated by the control command, performs an image capture process, acquires a zoomed image, and transmits the zoomed image to the image processing apparatus 100. Thereafter, the CPU 201 performs control so that the zoomed image received from the NW camera 110 is displayed in the field 610. The user confirms whether the bar code image is properly captured in the zoomed image displayed in the field 610 and can adjust the zoom magnification by changing the value input into the field 605 as necessary. At this time, if the value input to the field 605 is changed, the CPU 201 regenerates the control command and transmits the control command to the NW camera 110. The NW camera 110 performs an image capture process in accordance with the new control command, newly acquires a zoomed image, and transmits the zoomed image to the image processing apparatus 100. In this manner, the CPU 201 can receive, from the NW camera 110, a zoomed image subjected to an image capture process at a zoom magnification reflecting the change and display the zoomed image in the field 610. Thus, the user can examine the result of the change.

Subsequently, in S505, the CPU 201 sets the image capture order specified by the user in a field 608 as a zoomed image capture order. According to the present embodiment, it is assumed that one of two types of image capture order, that is, a vertical image capture order and a horizontal image capture order, can be selected. For vertical image capture, after the images of the divided areas in the same column are sequentially captured in the vertical direction, the images of the divided areas in the immediately right column are sequentially captured in the vertical direction. For the horizontal image capture, after the images of the divided areas in the same row are sequentially captured in the horizontal direction, the images of the divided areas in the immediately next row are sequentially captured in the horizontal direction. By sequentially capturing the images of neighboring divided areas in this way, the amount of movement for the pan and tilt required for the next image capture range can be reduced. FIG. 6 illustrates the image capture order when vertical image capture is set. If horizontal image capture is set, the displayed image capture order is also changed. Note that the above-mentioned image capture order is only an example, and any other image capture order can be used as long as the amount of movement for the pan and tilt is reduced.

Figure 7:
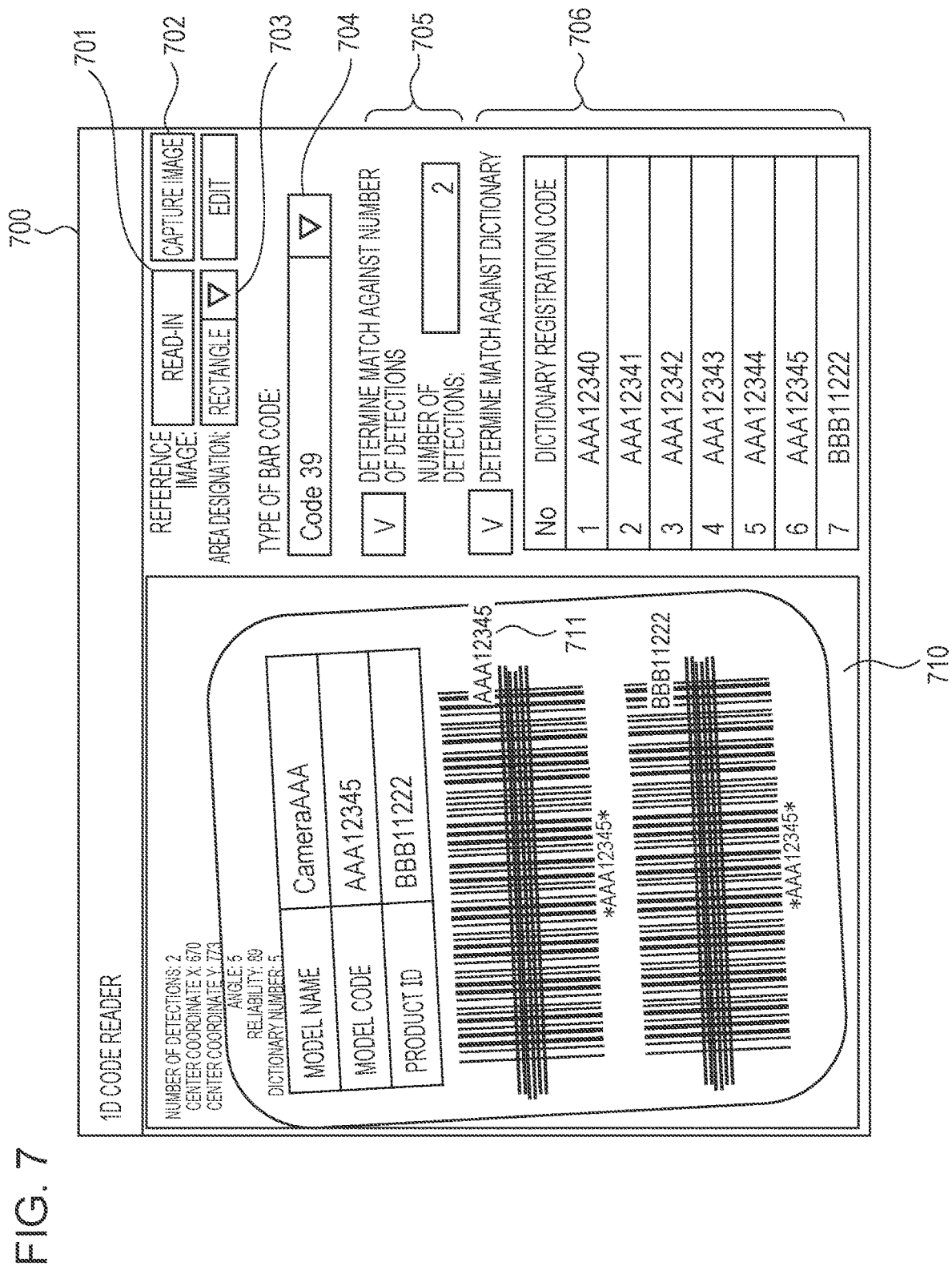
FIG. 7 is a diagram illustrating an example of a setting screen.

Subsequently, in S506, the CPU 201 reads a reference image. Note that the reference image is an image that serves as a reference for setting a zoomed image to be read. For example, the zoomed image displayed in the field 610 in S504 is stored in the HDD 205 and is read as a reference image. Subsequently, in S507, the CPU 201 sets variety of settings related to reading the object to be read (in the present embodiment, a bar code) in accordance with the user operation. FIG. 7 is a diagram illustrating an example of a setting screen 700 for receiving user operations when a user set the variety of settings. The user inputs a variety of settings through the setting screen 700. The reference image is displayed in a field 710 of the setting screen 700. When a read-in button 701 is pressed, the zoomed image previously stored in the HDD 205 is read out as a reference image and is displayed. Note that when an image capture button 702 is pressed, the CPU 201 may send a control command to the NW camera 110 to request image capture, receive an image captured by the NW camera 110 in response to the control command, and display the captured image as a reference image. By the operation performed on an area designation 703, a rectangular range within which a bar code is to be read is specified. Furthermore, the type of bar code to be read is input to a field 704. The number of bar codes to be detected in the zoomed image is input to a field 705. By using a field 706, a dictionary to be checked against the reading result of a bar code is selected in order to acquire the value. Each time the setting related to the bar code reading is changed through the setting screen 700, the CPU 201 performs a process of reading the bar code value from the reference image on the basis of the setting. Thereafter, the CPU 201 superimposes and displays, in the field 710, a value 711 obtained by checking the read bar code against the dictionary. In this manner, the user can confirm whether the variety of settings related to bar code reading are appropriate. Through the above-described operations, the preparatory process is completed.

Figure 8:
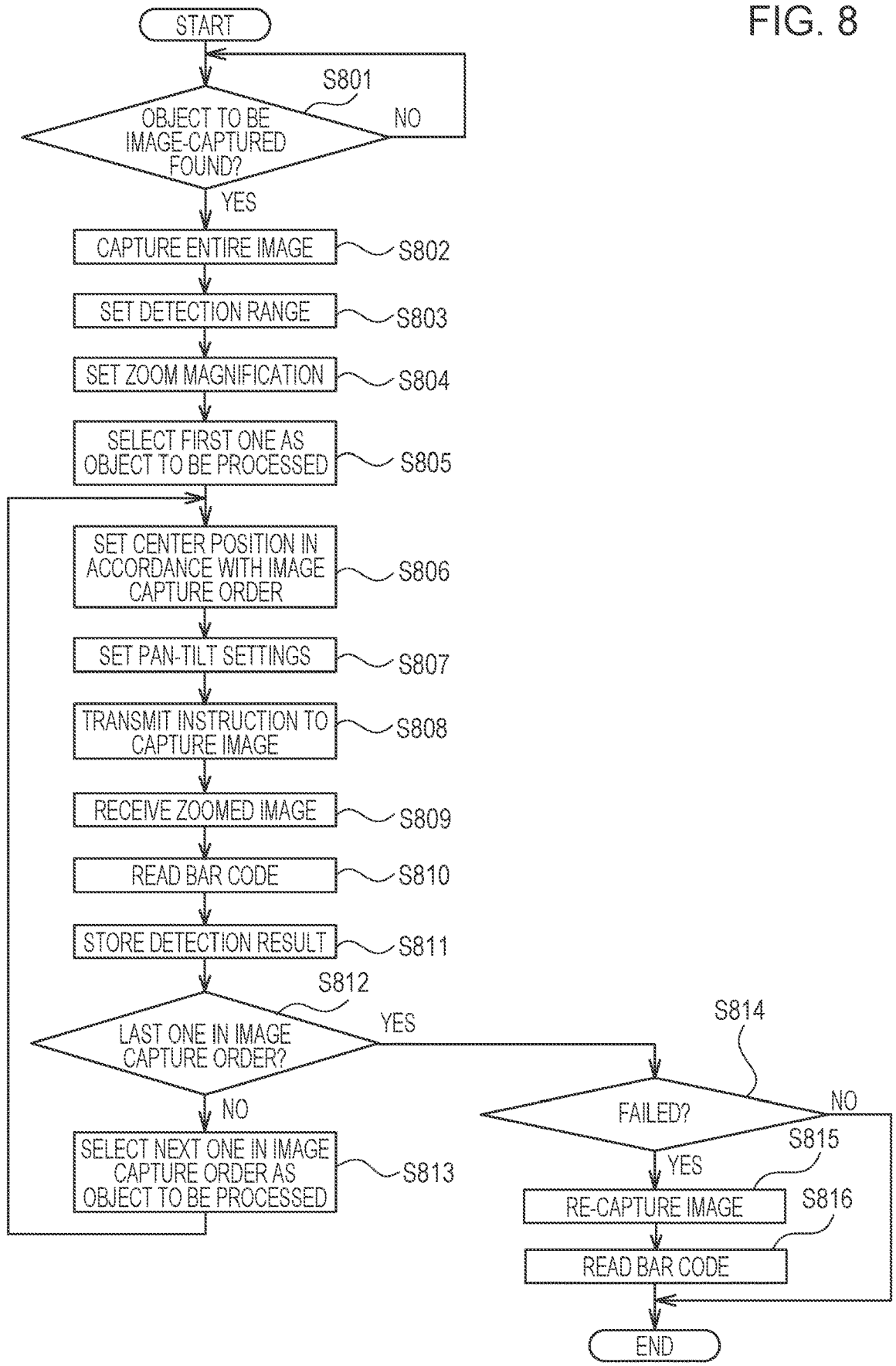
FIG. 8 is a flowchart illustrating a reading process.

FIG. 8 is a flowchart illustrating the reading process. When a cargo is carried in, the sensor 150 detects the cargo and notifies the PLC 140 of the detection. Upon receiving the notification from the sensor 150, the PLC 140 gives, to the image processing apparatus 100, a predetermined notification indicating that an object to be image-captured has been detected. In S801, the CPU 201 of the image processing apparatus 100 determines whether the predetermined notification has been received from the PLC 140. If the CPU 201 receives the predetermined notification from the PLC 140, the CPU 201 starts the reading process. In S802, the CPU 201 generates a control command in accordance with the value set in the field 601 illustrated in FIG. 6 and transmits the control command to the NW camera 110. The NW camera 110 receives the control command from the image processing apparatus 100, performs a pan-tilt-zoom operation in accordance with the settings indicated by the control command, and captures the entire image. Thereafter, the CPU 201 receives the entire image from the NW camera 110. Furthermore, in S803, the CPU 201 performs an image recognition process on the entire image received in S802, detects the area of the cargo, and compares the coordinates of the area with the coordinates of the detection range set in step S501. The CPU 201 calculates, on the basis of the result of the comparison, the deviation between the position of the detection range in the entire image used at the time of setting performed in the image capture screen 600 illustrated in FIG. 6 and the position of the detection range in the entire image received in S802. In this manner, the position of the detection range in the entire image, which is slightly different for each cargo and each image capture, can be corrected. Note that the angle information regarding the detection range may also be set in S501, and the deviation of the angle of the detection range may be calculated and corrected.

Subsequently, in S804, the CPU 201 sets, as the zoom magnification at the time of image capture, the zoom magnification input into the field 605 of the image capture screen 600 illustrated in FIG. 6. Subsequently, in S805, the CPU 201 sets, as the target to be processed, the divided area having the first image capture order. Subsequently, in S806, the CPU 201 sets the center position of the zoomed image capture for the divided area to be processed. If the center position is corrected by the input to the field 604, the corrected center position is set.

Subsequently, in S807, the CPU 201 sets the image capture range so that the NW camera 110 adjusts the pan-tilt in accordance with the center position of zoomed image capture set in S806. This process is an example of a change control process that controls a change in the image capture range. Subsequently, in S808, the CPU 201 generates a control command in accordance with the zoom magnification set in S804 and the image capture range set in S807 and transmits the control command to the NW camera 110. The NW camera 110 receives the control command from the image processing apparatus 100, performs a pan-tilt-zoom operation in accordance with the settings indicated by the control command, performs an image capture process, acquires a zoomed image, and transmits the zoomed image to the image processing apparatus 100. Note that since the zoom magnification itself is not changed for the second and subsequent divided areas, the NW camera 110 only performs pan-tilt adjustment and captures an image while changing the image capture range. This process is an example of an image capture control process.

In S809, the CPU 201 receives the zoomed image from the NW camera 110. Subsequently, in S810, the CPU 201 reads the bar code in the zoomed image received in S809 in accordance with the information set through the setting screen 700 illustrated in FIG. 7. The CPU 201 loads the zoomed image into the RAM 203 and detects an edge in the range of the shape specified by the area designation 703. Thereafter, the CPU 201 determines the portion where the edges having predetermined lengths are lined up in accordance with a predetermined rule to be a bar code, selects the correspondence information between the edge spacing and the output value on the basis of the type of the bar code specified in the field 704, and reads the value of the bar code from the edge spacing in the image. The correspondence information between the edge spacing associated with the type of bar code and the output value is stored in the HDD 205. Subsequently, in S811, the CPU 201 stores the bar code reading result in a storage unit, such as the HDD 205.

FIG. 9 is a diagram illustrating an example of the bar code reading result stored in the storage unit. "ID" is the identification information of a record. "Counter" is the identification information of the zoomed image. According to the present embodiment, "Counter" represents a number indicating the image capture order of the divided area corresponding to the zoomed image. "Divided image capture coordinates" are information indicating the center position of the zoomed image and are the coordinates corresponding to the cross mark 613. "Zoom range" is the coordinates of a rectangle corresponding to the image capture range 615 determined in accordance with the zoom magnification and the center position of zoomed image capture. Note that "Divided image capture coordinate" and "Zoom range" are information indicating the position in the entire image. "Number of detections" is the number of bar codes detected in the zoomed image. "Detection No." is the bar code identification information. According to the present embodiment, the detection No. is uniquely assigned in the zoomed image. However, the bar code identification information may be uniquely assigned in the detection range. "Center coordinates" are the coordinates of the center position of the bar code. Note that the center coordinates are information indicating the position in the zoomed image. However, the center coordinates may be values obtained by converting the position in the zoomed image into the position in the entire image. "Code angle" is the angle of inclination of the detected bar code with respect to the zoomed image. "Detection code" is code information detected as a result of checking the read bar code against the dictionary. "Reliability" is the recognition accuracy of the bar code. In addition to the above-described information, the results of "Number-of-detections determination", "Dictionary matching determination", and the "Comprehensive evaluation" are stored. The comprehensive evaluation is determined to be "OK" if, for example, the numbers of detections match, the values registered in advance in the dictionary match, and the reliability is higher than or equal to a threshold value. The mismatch in the number of detected bar codes occurs if, for example, a bar code that should exist is not detected (e.g., if the bar code sticker is peeled off, the bar code is hidden by something, or the bar code is dirty). In this case, the comprehensive evaluation is determined to be "NG". Note that the determination criterion for the comprehensive evaluation can be set as desired.

Subsequently, in S812, the CPU 201 determines whether the image capture order of the divided area to be processed is the last in the order. If the image capture order is the last (YES in S812), the CPU 201 proceeds to S814. If the image capture order is not the last (NO in S812), the CPU 201 proceeds to S813. In S813, the CPU 201 sets the next divided area in the image capture order as the target to be processed and, thereafter, proceeds to S806. In this case, the center position of the zoomed image capture is changed in S806, the pan-tilt is adjusted again in S807, the image capture range is switched, and the image capture instruction is given in S808. Note that in this case, since the zoom magnification is not changed, the operation of zooming out once and, thereafter, zooming in again is not performed. As a result, the processing time for driving the zoom of the NW camera 110 can be reduced.

In contrast, in S814, the CPU 201 refers to the bar code reading result illustrated in FIG. 9 and determines whether a zoomed image in which the reading of the bar code fails is found, that is, the image capture is successful or unsuccessful. If there is a failure (YES in S814), the CPU 201 proceeds to S815. If there is no failure (NO in S814), the CPU 201 ends the process.

In S815, to re-capture the zoomed image that has failed to read, the CPU 201 generates a control command so that the NW camera 110 pans and tilts in accordance with the center position of the zoomed image. Thereafter, the CPU 201 transmits the control command to the NW camera 110. The NW camera 110 receives the control command from the image processing apparatus 100, pans and tilts in accordance with the settings indicated by the control command, performs an image capture process, acquires a zoomed image, and transmits the zoomed image to the image processing apparatus 100. The CPU 201 receives the zoomed image from the NW camera 110. Subsequently, in S816, the CPU 201 again performs the bar code reading process on the received zoomed image in the same manner as in S810 and stores the bar code reading result in the storage unit. This process is the same as the process in S808 to S811. At this time, the CPU 201 generates a control command by shifting the center position of the zoomed image from a preset position. For example, the CPU 201 causes the NW camera 110 to capture an image by shifting the center position upward by a certain amount first. Thereafter, the CPU 201 returns to the process in S814 and determines whether the comprehensive evaluation of "OK" can be obtained. If the comprehensive evaluation of "OK" is obtained, the CPU 201 ends the process.

However, if the comprehensive evaluation of "NG" is obtained, the CPU 201 subsequently shifts the image capture range downward by a certain amount and generate a control command. Thereafter, the CPU 201 causes the NW camera 110 to capture an image. As described above, the CPU 201 sequentially shifts the center position of zoomed image upward, downward, leftward, and rightward so as to shift the image capture range and re-capture an image. As a result, even if the bar code tag is located at a misaligned position so that the bar code does not fit in the image capture range of the zoomed image and the bar code reading fails, the image of the bar code can be correctly captured through image re-capture. As another example, instead of shifting the center position of the zoomed image, the CPU 201 may change the zoom magnification set in S815, generate a control command, and cause the NW camera 110 to re-capture an image. In this case, the CPU 201 first changes the zoom magnification in the positive direction and, thereafter, causes the NW camera 110 to re-capture the image.

Subsequently, if the comprehensive evaluation of "NG" is obtained in S814, the CPU 201 again changes the zoom magnification in the negative direction and causes the NW camera 110 to re-capture an image. As a result, even if the bar code reading fails because part of the cargo is shifted forward or backward and is not in focus and, thus, reading of the bar code fails, the bar code can be read correctly by image re-capture. Furthermore, as another example, the CPU 201 may change the focus mode or focus value, the exposure (e.g., the mode, shutter speed, aperture, or gain), or the white balance setting and generate a control command. Thereafter, the CPU 201 may cause the NW camera 110 to re-capture the image.

Note that after the cargo A is carried in, a plurality of cargoes having the same number of packages and package stacking pattern as the cargo A may be continuously carried in. In this case, the preparatory process is not required for the second and subsequent cargoes. Upon receiving the notification that a cargo has been carried in, the image processing apparatus 100 starts the reading process. Note that in this case, the reading process is performed using the conditions set for the cargo A.

The result obtained through the reading process is stored in the storage unit of the apparatus, and the CPU 201 checks the result against the bar code information stored in the DB 120. However, the unit that performs the check is not limited to that described in the present embodiment. As another example, the DB 120 may perform the check. In this case, the reading result obtained by the image processing apparatus 100 is transmitted to the DB 120 via the POE hub 130. Still alternatively, the PLC 140 may perform the check. In this case, the reading result is transmitted to the PLC 140 via the POE hub 130.

As described above, the image processing system according to the first embodiment processes a cargo in which bar codes are regularly arranged in a matrix pattern and can identify the positions of the plurality of bar codes attached to the cargo in one go. In addition, the image processing system can continuously capture a plurality of zoomed images in accordance with the identified position by only adjusting the pan-tilt without changing the zoom magnification. That is, a zoom-in/zoom-out process is not needed each time image capture is performed. Therefore, the processing load related to image capture is reduced, and the processing time can be reduced.

A first modification is described below. According to the present embodiment, it is assumed that the number of packages arranged vertically and horizontally in a cargo can vary from cargo to cargo and, thus, the number of divisions is input by the user. However, when the numbers of packages in the vertical direction and horizontal direction are constant, it is not necessary to input the number of divisions. Accordingly, the CPU 201 can acquire the number of divisions set in advance in the image processing apparatus 100 and divide the detection range in accordance with the acquired number.

As a second modification, the image processing apparatus 100 may identify the type of tag (e.g., the shipping company) from a mark or the like attached to the tag and identify the zoom magnification at the time of image capture of a zoomed image in accordance with the identified type. The image processing apparatus 100 stores in advance a table in which the type of tag and the zoom magnification are associated with each other. The image processing apparatus 100 refers to the table and determines the zoom magnification by using the type of tag. If the distance to the cargo is predetermined, the image processing apparatus 100 sets the zoom magnification suitable for the size of the bar code and the character size printed on the tag in accordance with the type of tag. As a result, the image processing apparatus 100 can automatically set the zoom magnification.

As a third modification, the image processing apparatus 100 may automatically set the zoom magnification at the time of image capture of the zoomed image on the basis of the focal length at the time of image capture of the entire image.

Second Embodiment

Figure 10:
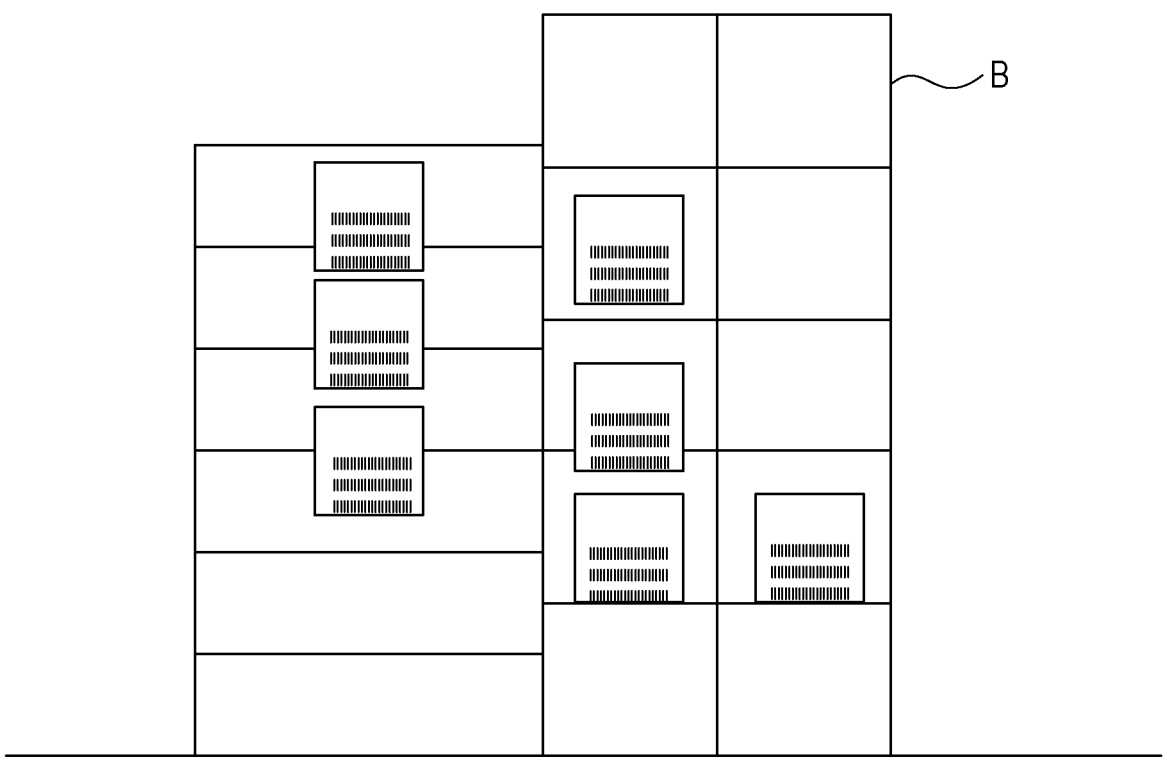
FIG. 10 is a diagram illustrating a cargo.

The difference between an image processing system according to the second embodiment and the image processing system according to the first embodiment is mainly described below. As illustrated in FIG. 10, the image processing system according to the second embodiment processes a cargo B in which the tags are not regularly arranged. The image processing apparatus 100 performs pattern matching on the entire image, detects an area where the image of a tag appears in the entire image, and determines the range of zoomed image capture in accordance with the detection result.

Figure 11:
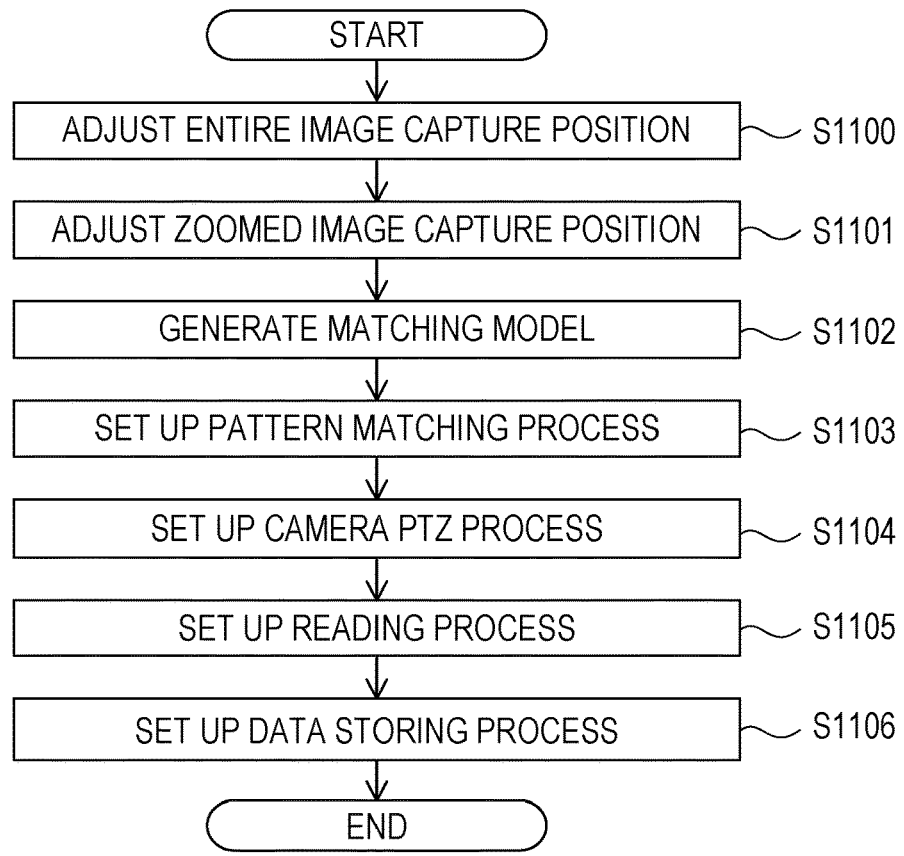
FIG. 11 is a flowchart illustrating a preparatory process.

FIG. 11 is a flowchart illustrating a preparatory process performed by the image processing apparatus 100 according to the second embodiment. In S1100, the CPU 201 adjusts the position at the time of capturing the image of the entire cargo (an entire image capture position) in accordance with the user operation. While viewing the image of the cargo displayed on the display 204, the user adjusts the pan-tilt-zoom so that the entire cargo fits within the image capture range. The CPU 201 generates a control command in accordance with the pan-tilt-zoom settings adjusted in accordance with the user operation and transmits the control command to the NW camera 110. The NW camera 110 receives the control command from the image processing apparatus 100, performs pan-tilt-zoom operation in accordance with the settings indicated by the control command, performs an image capture process, acquires the entire image, and transmits the entire image to the image processing apparatus 100. The CPU 201 performs control so that the received entire image is displayed on the display 204.

Figure 12:
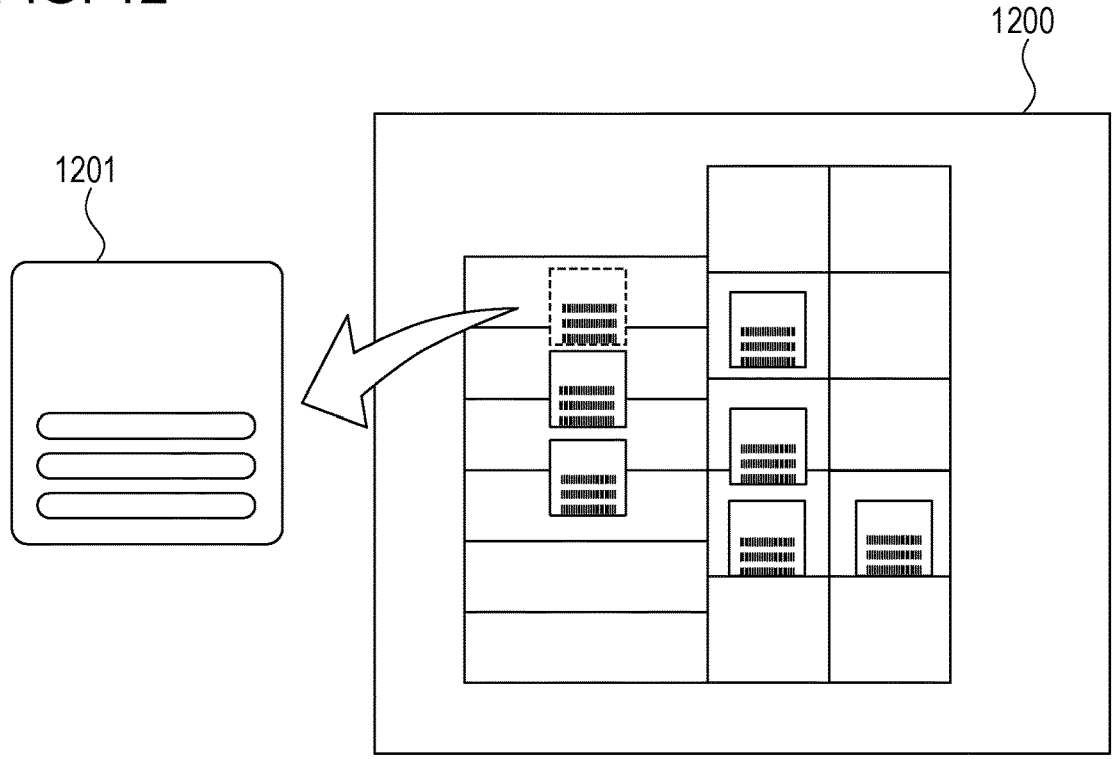
FIG. 12 is a diagram illustrating a matching model.

Subsequently, in S1101, the CPU 201 specifies the position of the tag region including the bar code to be read in the entire image. More specifically, the user views the entire image displayed on the display 204 to find the region of the tag in the entire image and performs an operation to specify the position. The CPU 201 specifies the position of the tag region in the entire image in accordance with this user operation. Subsequently, in S1102, the CPU 201 generates a matching model (a model image). More specifically, the CPU 201 extracts the image of the tag from an entire image 1200 illustrated in FIG. 12 in accordance with the position of the region specified in S1102. Thereafter, the CPU 201 defines the extracted image as a matching model 1201 of the tag image.

Figure 13:
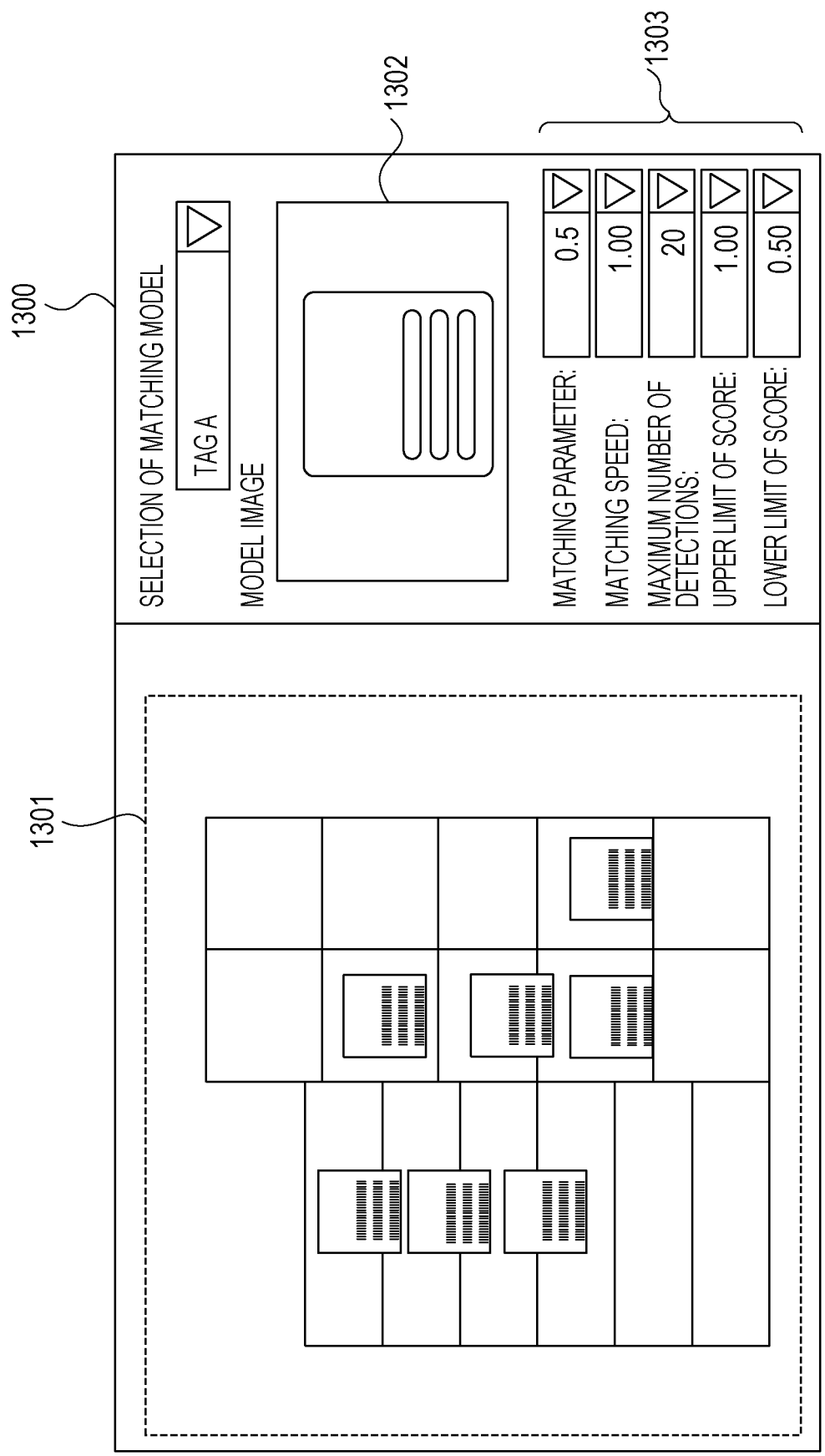
FIG. 13 is a diagram illustrating an example of a setting screen.

Subsequently, in S1103, the CPU 201 sets up a pattern matching process. More specifically, the CPU 201 sets, in a setting screen 1300 illustrated in FIG. 13, the target area for the pattern matching process in accordance with a frame 1301 set by the user. In addition, the CPU 201 sets a matching model in accordance with the user operation. As used herein, the term "setting of a matching model" refers to specifying a matching model image in order to use the matching model generated in S1102 as the reference image of the matching process to be performed in S1103. The set matching model is displayed in 1302. Furthermore, the CPU 201 sets matching parameters in accordance with the input to a field 1303. Still furthermore, the CPU 201 determines the order in which the matching process is performed. For example, the CPU 201 sets the order such that the pattern matching process is performed on the x coordinate in the ascending/descending order or is performed on the y coordinate in the ascending/descending order.

Figure 14:
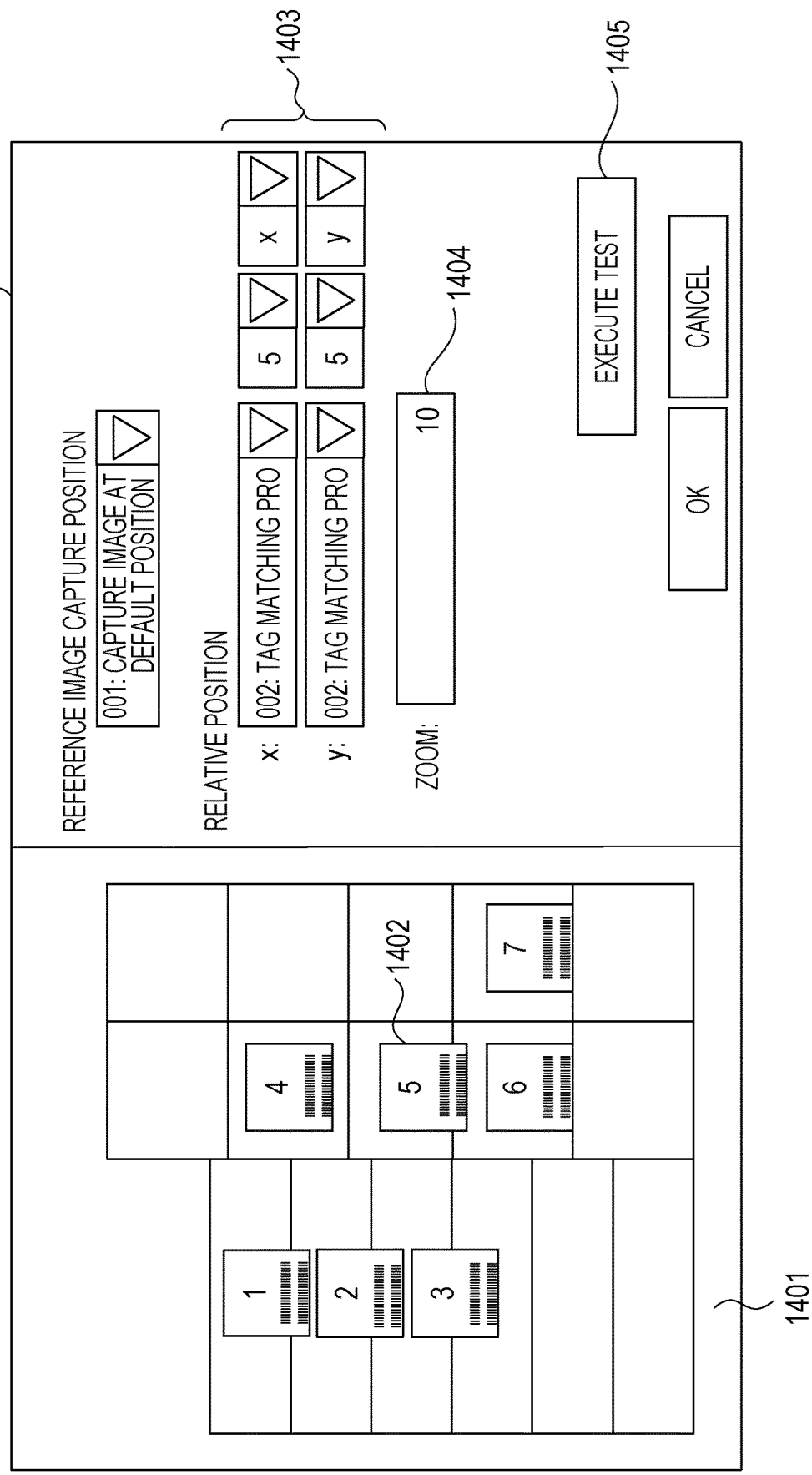
FIG. 14 is a diagram illustrating an example of a test screen.

After the pattern matching process is performed, the CPU 201 displays a test screen 1400 illustrated in FIG. 14 on the display 204. The entire image is displayed in a field 1401 of the test screen 1400, and a frame 1402 illustrating the matching result is superimposed on each of regions where the matching model appears. In FIG. 14, all tag regions 1 to 7 match the matching model, which indicates that the detection is successful. The user refers to the matching result. If the user finds the tag region that failed to be detected, the user specifies again the zoomed image capture position in the area 1403 or resets the zoom magnification in a field 1404. In this manner, the user can adjust the accuracy of the pattern matching process. Thus, at least one of the tag regions detected through the pattern matching process is set as the zoomed image capture position for the test.

Subsequently, in S1104, when a test execution button 1405 is pressed in the test screen 1400 with the zoomed image capture position and zoom magnification set, the CPU 201 generates a control command in accordance with the settings and transmits the control command to the NW camera 110. The NW camera 110 receives the control command from the image processing apparatus 100, performs a pan-tilt-zoom operation in accordance with the settings indicated by the control command, performs an image capture process, acquires a zoomed image, and transmits the zoomed image to the image processing apparatus 100. Thereafter, the CPU 201 displays the zoomed image received in the field 1401. The user can check whether the image of the bar code is properly captured in the zoomed image and adjust the zoom magnification. Subsequently, in S1105, the CPU 201 further sets the reading settings. The reading setting process is the same as that in S507 illustrated in FIG. 5. That is, the CPU 201 sets a rectangular area for reading a bar code, the type of bar code, the number of bar codes, a dictionary, and the like. Subsequently, in S1106, the CPU 201 makes settings for storing the information read in the reading process (described below). More specifically, as illustrated in FIG. 15, a storage area for storing data is created.

Figure 16:
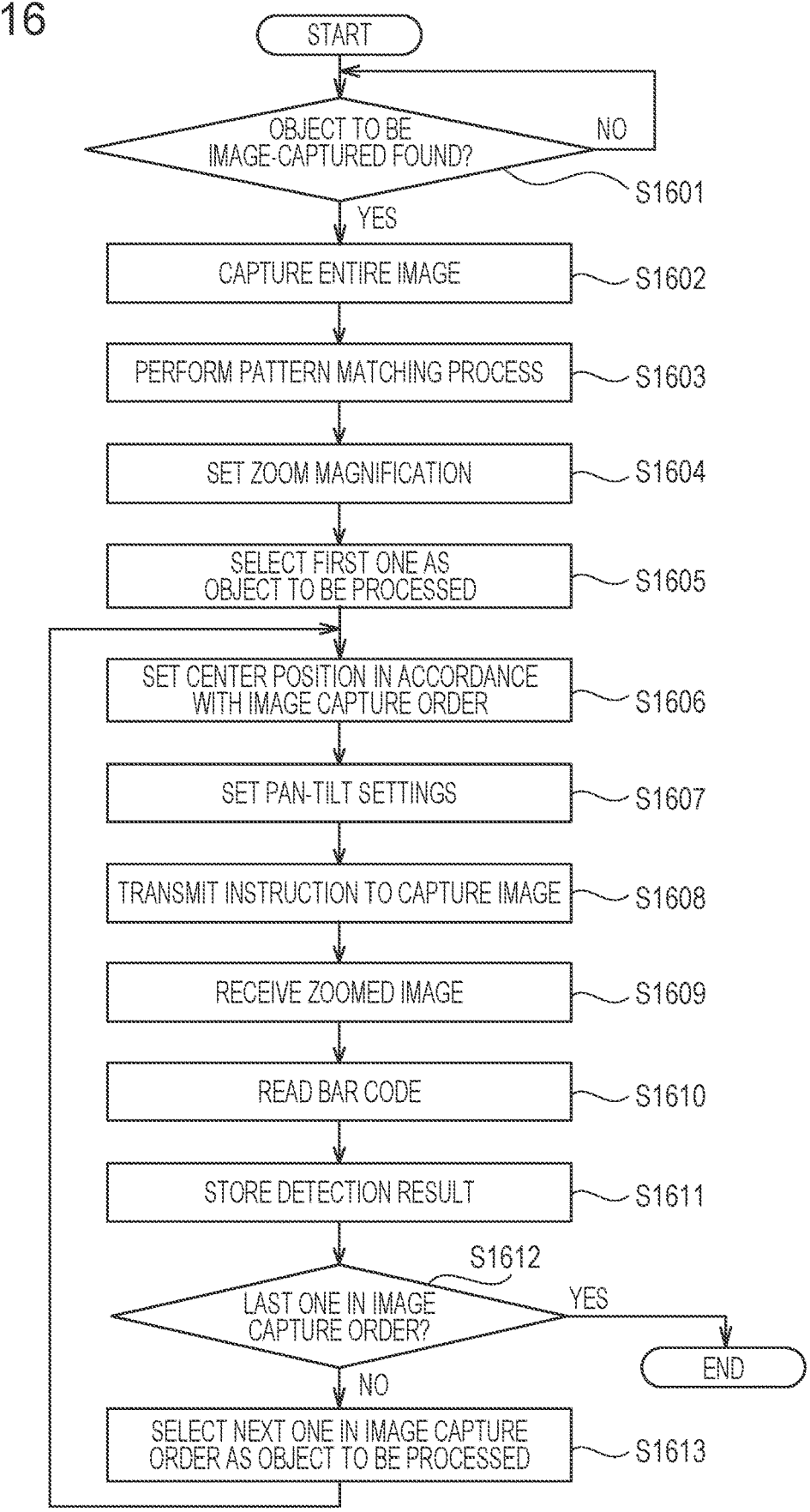
FIG. 16 is a flowchart illustrating a reading process.

FIG. 16 is a flowchart illustrating the reading process. When a cargo is carried in, the sensor 150 detects the cargo and gives a notification to the PLC 140. Upon receiving the notification from the sensor 150, the PLC 140 gives, to the image processing apparatus 100, a predetermined notification indicating that an object to be image-captured has been detected. In S1601, the CPU 201 of the image processing apparatus 100 determines whether the predetermined notification has been received from the PLC 140. If the CPU 201 has received the predetermined notification from the PLC 140, the CPU 201 starts the reading process. In S1602, the CPU 201 generates a control command under the image capture conditions set in S1100 (FIG. 11) and transmits the control command to the NW camera 110. The NW camera 110 receives the control command from the image processing apparatus 100, performs a pan-tilt-zoom operation in accordance with the settings indicated by the control command, performs an image capture process, acquires the entire image, and transmits the entire image to the image processing apparatus 100. Subsequently, in S1603, the CPU 201 performs a pattern matching process on the entire image received in S1602 in accordance with the information set in the flow illustrated in FIG. 11 and detects the image of a tag. Let N be the number of images of the detected tags. Subsequently, in S1604, the CPU 201 sets the zoom magnification set in S1104.

Subsequently, in S1605, the CPU 201 sets the image of a first tag among the detected images of the tags as the target to be processed in accordance with the image capture order. Subsequently, in S1606, the CPU 201 sets the detected position of the image of the first tag as the center position of image capture. Subsequently, in S1607, the CPU 201 generates a control command in accordance with the center position set in S1606 and the zoom magnification set in S1604 and transmits the control command to the NW camera 110. The NW camera 110 receives the control command from the image processing apparatus 100, performs a pan-tilt-zoom operation in accordance with the settings indicated by the control command, performs an image capture process, acquires a zoomed image, and transmits the zoomed image to the image processing apparatus 100. Note that since the zoom magnification is not changed for the second and subsequent tag images, the NW camera 110 adjusts only the pan and tilt settings for image capture. Subsequent process in S1608 to S1613 is the same as the processes in S808 to S813 illustrated in FIG. 8.

Note that according to the second embodiment, in S1612, when the order of image capture is the last (Nth order) (YES in S1612), the reading process ends. However, as described in the first embodiment, if a zoomed image that has failed to read is found, the zoomed image may be re-captured. Furthermore, if the bar code reading process fails in S1610 due to insufficient pan-tilt control accuracy of the NW camera in the pan-tilt setting performed in S1607, the zoom magnification setting, the matching process, and the pan-tilt setting may be performed step by step. More specifically, the zoom magnification is set in S1604 so as to be lower than the zoom magnification at which the code reading in S1610 can be performed. After the image capture instruction is submitted in S1608, the pattern matching process for the image of the tag is performed again. For a tag having the coordinates of the matching result that are close to the center of the screen, the pan-tilt setting is made by changing the setting of the center position. Thereafter, an image capture instruction is given at the zoom magnification set in S1604, and a bar code is read for the received zoomed image. As described above, the positional shift increases with increasing zoom magnification. For this reason, by temporarily reducing the zoom magnification, changing the pan-tilt zoom settings, and re-capturing the image, the exact position at which the bar code is affixed can be obtained. As a result, the bar code can be successfully read.

Figure 17:
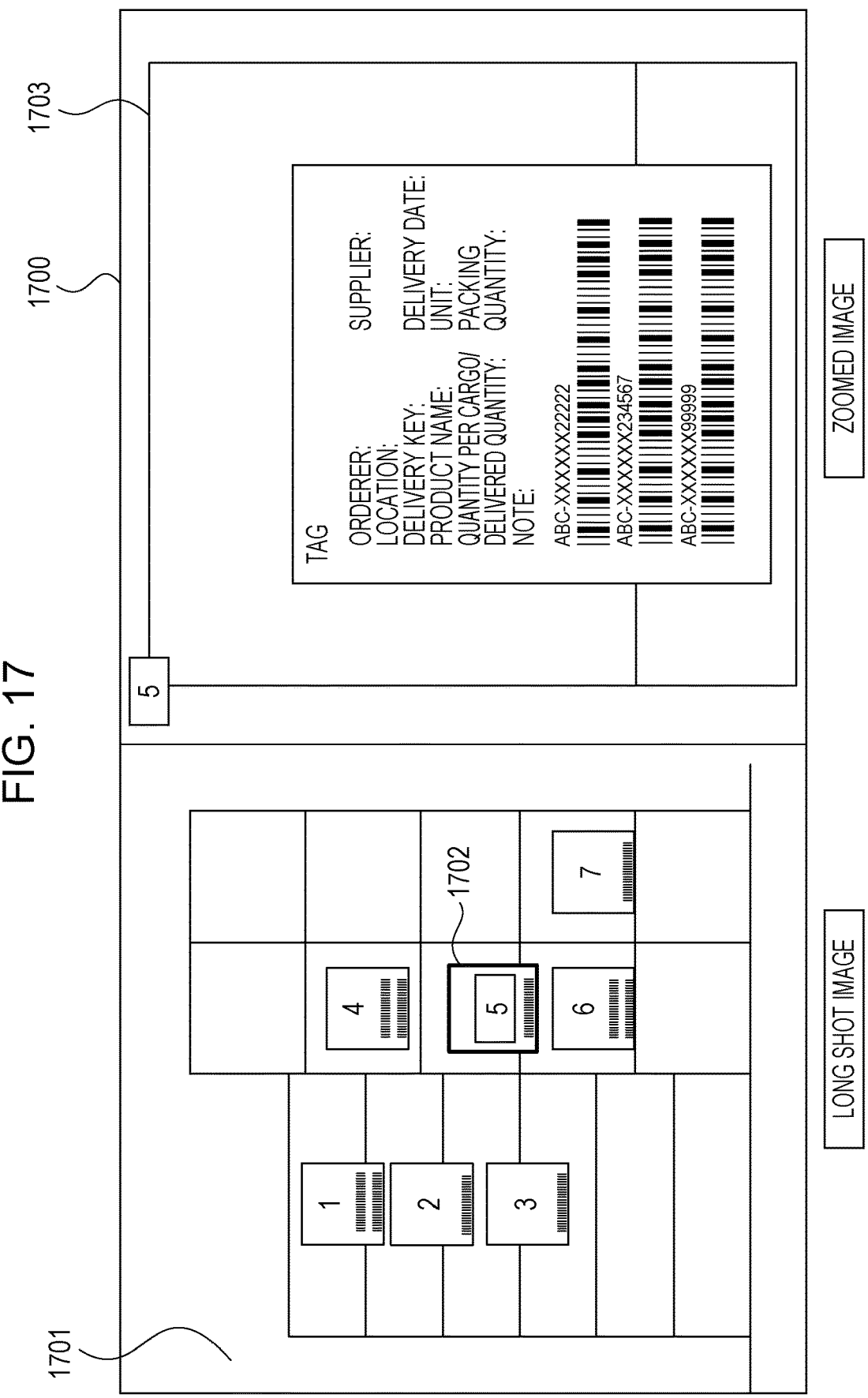
FIG. 17 is a diagram illustrating an example of an image capture screen.
Figure 18:
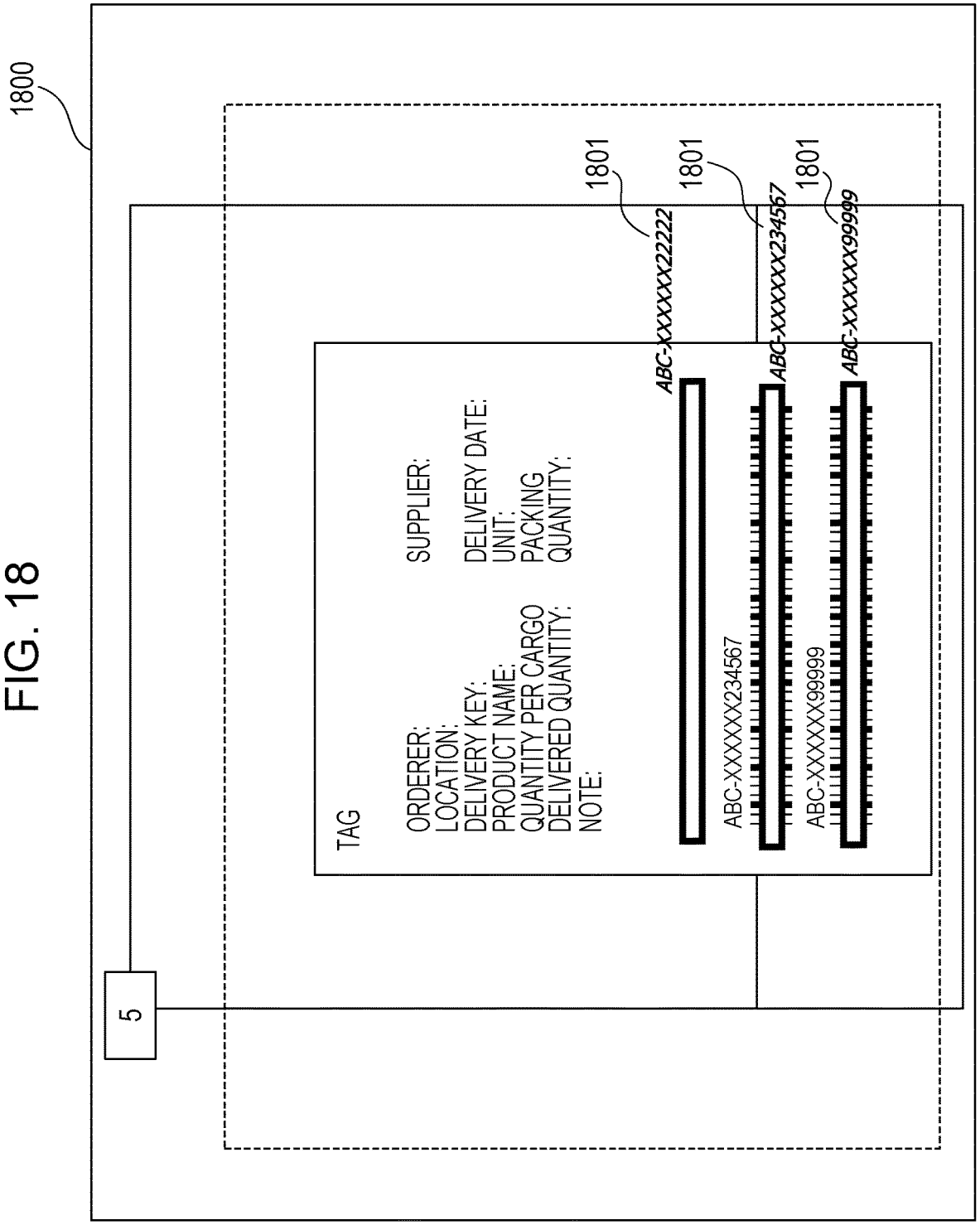
FIG. 18 is a diagram illustrating an example of a reading screen.

FIG. 17 is a diagram illustrating an example of an image capture screen 1700 displayed when a zoomed image is received (S1609). The entire image captured by the NW camera 110 is received and displayed in a field 1701, and a frame 1702 illustrating the matching result by the detection of the tag is superimposed. In addition, the zoomed image captured by the NW camera 110 is received and displayed in a field 1703. FIG. 18 is a diagram illustrating an example of a reading screen 1800 displayed at the time of reading a bar code (S1610). The reading screen 1800 displays a bar code reading result 1801 therein.

As described above, even when the tags are not regularly arranged on a cargo, the image processing system according to the second embodiment automatically identifies the positions of a plurality of bar codes on the tags and sequentially captures a plurality of zoomed images without changing the zoom magnification. As a result, the processing load related to image capture can be reduced, and the processing time can be reduced.

Furthermore, as described above, according to the present invention, when there are a plurality of objects to be image-captured, the processing load related to image capture can be reduced, and the processing time can be reduced.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus capable of communicating with an image capturing apparatus, comprising:
   a processor; and a memory storing a program which, when executed by the processor, causes the image processing apparatus to:
   acquire a first image generated by performing an image capture process at a first zoom magnification;
   set a division condition for dividing a detection range included in the first image;
   divide the detection range into a plurality of divided areas in accordance with the division condition;
   control the image capturing apparatus to change an image capture direction on the basis of each position of the respective divided areas of the detection range and perform an image capture process at a second zoom magnification greater than the first zoom magnification so as to sequentially generate second images;
   acquire each of the second images; and
   perform a data reading process for each of the second images,
   wherein the program when executed by the processor further causes the image processing apparatus to control the image capturing apparatus to perform the image capture process at the first zoom magnification, generate a third image that differs from the first image and divide a detection range included in the third image into a plurality of divided areas in accordance with the division condition, and further causes to control the image capturing apparatus to change the image capture direction on the basis of each position of the respective divided areas of the detection range in the third image, and perform an image capture process at the second zoom magnification so as to sequentially generate fourth images that differ from the second images.

2. The image processing apparatus according to claim 1, wherein the division condition relates to the number of divisions.

3. The image processing apparatus according to claim 1, wherein the division condition is set in accordance with a user operation.

4. The image processing apparatus according to claim 1, wherein the program when executed by the processor further causes the image processing apparatus to
   perform a pattern matching process between the first image and a predetermined model image,
   wherein the division condition is set on the basis of a recognition result of the pattern matching process.

5. The image processing apparatus according to claim 1, wherein the detection range is further set in accordance with a user operation.

6. The image processing apparatus according to claim 1, wherein the first zoom magnification is determined in accordance with a user operation.

7. The image processing apparatus according to claim 1, wherein the first zoom magnification is determined on the basis of a focal length for an object to be image-captured in the detection range.

8. The image processing apparatus according to claim 1, wherein the second zoom magnification is determined on the basis of the division condition.

9. The image processing apparatus according to claim 1, wherein the detection range includes the image of a tag, and the program when executed by the processor further causes the image processing apparatus to determine the type of tag, and the second zoom magnification is determined by referring to a table in which the type of tag is associated with a zoom magnification.

10. The image processing apparatus according to claim 1, wherein the first image and the second image are acquired, respectively, from the image capturing apparatus via a network.

11. The image processing apparatus according to claim 1, wherein if the data reading process performed is in failure, at least one of the image capture direction and the second zoom magnification based on each position of the respective divided areas corresponding to the second image is changed and the image capture process is performed again to generate the second image.

12. The image processing apparatus according to claim 1, wherein the program when executed by the processor further causes the image processing apparatus to generate a control command in accordance with at least one of the zoom magnification and the image capture direction based on each position of the respective divided areas, and transmit the control command to the image capturing apparatus so as to control the image capturing apparatus.

13. The image processing apparatus according to claim 12, wherein the program when executed by the processor further causes the image processing apparatus to communicate with the image capturing apparatus via a POE (Power over Ethernet) hub,
wherein the control command is transmitted to the image capturing apparatus via the POE.

14. The image processing apparatus according to claim 1, wherein the data is at least one of a barcode, a QR code (registered trademark), and a character string.

15. The image processing apparatus according to claim 1, wherein the program when executed by the processor further causes the image processing apparatus to receive information detected by an external sensor, and
in response to the information from the sensor, control the image capturing apparatus to perform the image capture process at the first zoom magnification and generate the third image.

16. The image processing apparatus according to claim 1, wherein the program when executed by the processor further causes the image processing apparatus to adjust the detection range in the third image on the basis of the detection range in the first image.

17. The image processing apparatus according to claim 1, wherein the program when executed by the processor further causes the image processing apparatus not to perform the data reading process on the first image.

18. A method for controlling an image processing apparatus capable of communicating with an image capturing apparatus, comprising:
acquiring a first image generated by performing an image capture process at a first zoom magnification;
setting a division condition for dividing a detection range included in the first image;
dividing the detection range into a plurality of divided areas in accordance with the division condition;
controlling the image capturing apparatus to change an image capture direction on the basis of each position of the respective divided areas of the detection range and perform an image capture process at a second zoom magnification greater than the first zoom magnification so as to sequentially generate second images;
acquiring each of the second images; and
performing data reading process for each of the second images,
wherein the method further comprises:
controlling the image capturing apparatus to perform the image capture process at the first zoom magnification, generating a third image that differs from the first image and dividing a detection range included in the third image into a plurality of divided areas in accordance with the division condition, controlling the image capturing apparatus to change the image capture direction on the basis of each position of the respective divided areas of the detection range in the third image, and performing an image capture process at the second zoom magnification so as to sequentially generate fourth images that differ from the second images.

19. A non-transitory computer-readable storage medium storing a program for causing a computer to function as an image processing apparatus capable of communicating with an image capturing apparatus, comprising:
a processor; and a memory storing a program which, when executed by the processor, causes the image processing apparatus to:
acquire a first image generated by performing an image capture process at a first zoom magnification;
set a division condition for dividing a detection range included in the first image;
divide the detection range into a plurality of divided areas in accordance with the division condition;
control the image capturing apparatus to change an image capture direction on the basis of each position of the respective divided areas of the detection range and perform an image capture process at a second zoom magnification greater than the first zoom magnification so as to sequentially generate second images;
acquire each of the second images; and
perform a data reading process for each of the second images,
wherein the program when executed by the processor further causes the image processing apparatus to control the image capturing apparatus to perform the image capture process at the first zoom magnification, generate a third image that differs from the first image and divide a detection range included in the third image into a plurality of divided areas in accordance with the division condition, and further causes to control the image capturing apparatus to change the image capture direction on the basis of each position of the respective divided areas of the detection range in the third image, and perform an image capture process at the second zoom magnification so as to sequentially generate fourth images that differ from the second images.

* * * * *